United States Patent [19]

Murakami et al.

[11] Patent Number: 5,437,059
[45] Date of Patent: Jul. 25, 1995

[54] RADIO TRANSMITTING SYSTEM HAVING BACK-UP RADIO RECEIVER OPERABLE IN RESPONSE TO FAILURE OF MAIN FEED LINE

[75] Inventors: Hirokazu Murakami; Toshihiro Yabe, both of Kawasaki; Makoto Takahashi; Norio Sasaki, both of Sendai, all of Japan

[73] Assignees: Fujitsu Ltd., Kanagawa; Aomori Telemessage, Inc., Aomori; Tohoku Electric Power Co., Miyagi, all of Japan

[21] Appl. No.: 906,849

[22] Filed: Jun. 30, 1992

[30] Foreign Application Priority Data

Jul. 5, 1991 [JP] Japan .................... 3-165660

[51] Int. Cl.$^6$ ............................. H04B 7/00
[52] U.S. Cl. ................... 455/512; 455/56.1; 455/8; 455/9; 455/14; 371/8.2
[58] Field of Search ............ 455/8, 14, 51.1, 53.1, 455/56.1, 67.1, 18, 9, 51.2; 379/33, 58, 273, 279, 40; 340/825.01, 827, 825.03; 371/11.2, 8.2

[56] References Cited

U.S. PATENT DOCUMENTS

| | | | |
|---|---|---|---|
| 4,887,290 | 12/1989 | Dop et al. | 379/33 |
| 5,125,021 | 7/1992 | Lebowitz | 379/40 |
| 5,239,671 | 8/1993 | Linquist et al. | 455/56.1 |

FOREIGN PATENT DOCUMENTS

| | | | |
|---|---|---|---|
| 0026025 | 2/1981 | Japan | 455/8 |
| 0051626 | 3/1983 | Japan | 455/8 |
| 0084028 | 5/1985 | Japan | 455/8 |
| 4082425 | 3/1992 | Japan | 455/53.1 |

OTHER PUBLICATIONS

Mitsuhiko Iino et al., "Development of Unit for Storing and Relaying Signals for Radio Calling", Mar. 1992.

Primary Examiner—Edward F. Urban
Assistant Examiner—Doris To
Attorney, Agent, or Firm—Armstrong, Westerman, Hattori, McLeland & Naughton

[57] ABSTRACT

A radio calling system includes a central control station simultaneously broadcasting a calling signal of an arbitrary pager terminal, and a plurality of radio transmitting stations coupled to the central control station. The plurality of radio transmitting stations simultaneously transmit the calling signal received from the central control station at the same radio frequency. The calling signal transmitted from the radio transmitting stations reach the arbitrary pager terminal and at least a neighboring one of the radio transmitting stations. At least an arbitrary one of the radio transmitting stations includes a first relay for relaying the calling signal received from the central control station, a second relay which has a receiver part for receiving the calling signal transmitted from a radio transmitting station other than the arbitrary radio transmitting station, and a storage relay part for storing the calling signal received by the receiver part and for transmitting the stored calling signal during a time in which no transmission is made by the radio transmitting stations other than the arbitrary radio transmitting station. A switching circuit coupled to the first and second relays carries out switching to enable one of the first and second relays, depending on whether or not a communication failure exists between the central control station and the arbitrary radio transmitting station.

9 Claims, 12 Drawing Sheets

RADIO TRANSMITTING SYSTEM HAVING BACK-UP RADIO RECEIVER OPERABLE IN RESPONSE TO FAILURE OF MAIN FEED LINE

BACKGROUND OF THE INVENTION

The present invention generally relates to radio calling systems, and more particularly to a radio calling system in which a central control station simultaneously broadcasts a pager terminal calling number from a subscriber to a plurality of radio transmitting stations via leased lines and each radio transmitting station simultaneously broadcasts a calling signal at the same radio frequency so as to call the pager terminal.

The pager terminal (bleeper) is becoming very popular, and it is necessary to positively call the user even when the user is at a snowy district or a remote place.

FIG. 1 generally shows an example of a conventional radio calling system for the pager terminal. The radio calling system includes a public line network, a central control station 200 and radio transmitting stations 300a through 300d.

When the subscriber calls the pager terminal via the public line network 100, the central control station 200 simultaneously broadcasts the pager terminal number to the radio transmitting stations 300a through 300d via leased lines. Each of the radio transmitting stations 300a through 300d simultaneously transmit a calling signal of the pager terminal number at the same radio frequency so as to call the pager terminal.

Normally, one region is divided into a plurality of areas. In this example, there are four areas Aa through Ad, and the radio transmitting stations 300a through 300d are respectively located within the areas Aa through Ad. The pager terminal can be called within the entire region by connecting these radio transmitting stations 300a through 300d to the central control station 200 via the leased lines. However, if the leased line connecting to the radio transmitting station 300a fails and the calling data cannot be transmitted to the radio transmitting station 300a, for example, the pager terminal within the area Aa cannot receive the call because the reception sensitivity of the pager terminal is poor. Hence, the reliability of the radio calling system is conventionally improved by providing two systems of leased lines and radio transmitting stations.

FIG. 2 shows the construction of an essential part of the conventional radio calling system for the pager terminal. In FIG. 2, those parts which are the same as those corresponding parts in FIG. 1 are designated by the same reference numerals, and a description thereof will be omitted.

In the radio calling system shown in FIG. 2, the central control station 200 includes a data transmitter-receiver 201, and a line switching controller 202. On the other hand, the radio transmitting station 300a includes a data transmitter-receiver 301, a line switching controller 302, a switching circuit 303 for switching the line data, transmitters 304a and 304b which are normally provided to form two systems, a transmitter switching controller 305, a switching circuit 306 for switching the data to the transmitters 304a and 304b, and a transmission antenna 307.

Normally, the communication between the central control station 200 and the radio transmitting station 300a is made via a normal line 500a. Between the central control station 200 and the radio transmitting stations 300a through 300d, inquiries from the central control station 200 and answers from the radio transmitting stations 300a through 300d are carried out at a rate of approximately four times per second. When a call to the pager terminal is generated from the public line network 100, the calling signal is simultaneously broadcast to each of the radio transmitting stations 300a through 300d.

If the normal line 500a fails, for example, the connection between the central control station 200 and the radio transmitting station 300a is switched to an emergency (or spare) line 500b manually by the maintenance person or automatically by the line switching controllers 202 and 302. While the emergency line 500b is in use, the maintenance person restores the normal line 500a, and connection is then switched back to the normal line 500a after the normal line 500a is restored.

However, there are cases where both the normal line 500a and the emergency line 500b fail. In a remote area in the mountains, for example, the lines are carried on telephone poles, and the configuration and cost may make it impossible for the normal and emergency lines 500a and 500b to be carried on different telephone poles. As a result, when the telephone pole which carries both the normal and emergency lines 500a and 500b breaks due to a storm, for example, both the normal and emergency lines 500a and 500b fail.

Conventionally, when both the normal and emergency lines 500a and 500b fail, it no longer is possible to provide the calling service within the area Aa. The chances of both the normal and emergency lines 500a and 500b failing are relatively high particularly if the radio transmitting station 300a is located at the snowy district or the remote place. Moreover, when both the normal and emergency lines 500a and 500b fail, it takes considerable time to restore both lines, and there is a problem in that the calling service within the area Aa is stopped for a considerably long time while the restoration takes place.

SUMMARY OF THE INVENTION

Accordingly, it is a general object of the present invention to provide a novel and useful radio calling system in which the problem described above is eliminated.

Another and more specific object of the present invention is to provide a radio calling system comprising a central control station for simultaneously broadcasting a calling number of a pager terminal from a subscriber, and a plurality of radio transmitting stations, coupled to the central control station, for simultaneously transmitting a calling signal at the same radio frequency in response to the calling number received from the central control station, so as to call the pager terminal. Each of the radio transmitting stations include first relay means for relaying the calling signal of the calling number from the central control station, second relay means comprising a receiver part for receiving the calling signal which is transmitted from a radio transmitting station other than the radio transmitting station to which the second relay means belongs, and a storage relay part for storing the calling signal received by the receiver part and for transmitting the stored calling signal during a time in which no transmission is made by the radio transmitting stations other than the radio transmitting station to which the second relay means belongs, and switching means, coupled to the first and second relay means, for carrying out a switching to enable one of the first and second relay means depending on whether or not a communication failure exists between the central control station and the radio transmitting station to which the switching means belongs. According to the radio calling system of the present invention, it is possible to quickly resume the calling service even if a communication failure occurs between the central control station and one of the radio transmitting stations. As a result, the reliability of the paging system is greatly improved.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 3.

Figure 1:
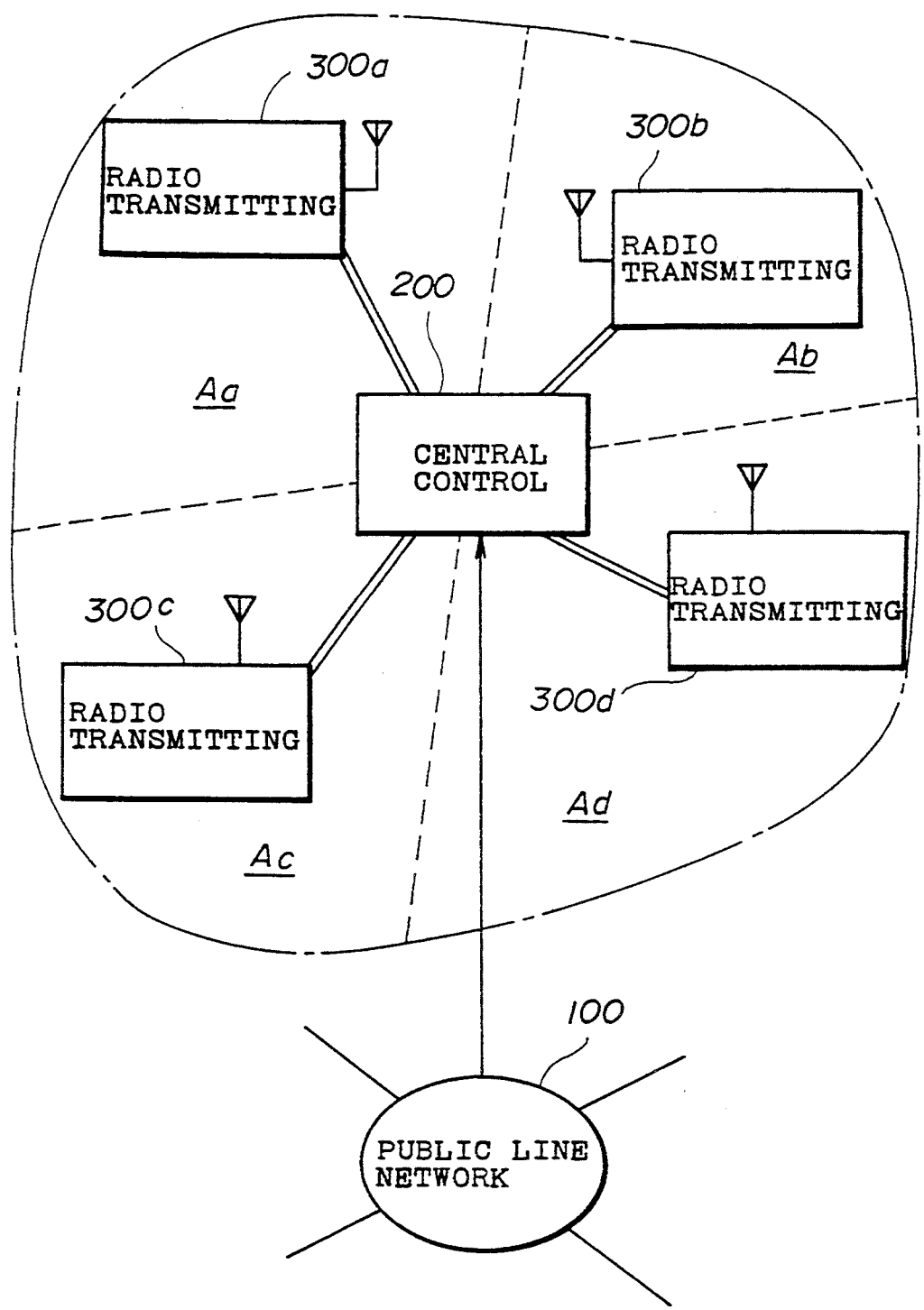
FIG. 1 is a system block diagral generally showing an example of a conventional radio calling system for a paging terminal.
Figure 2:
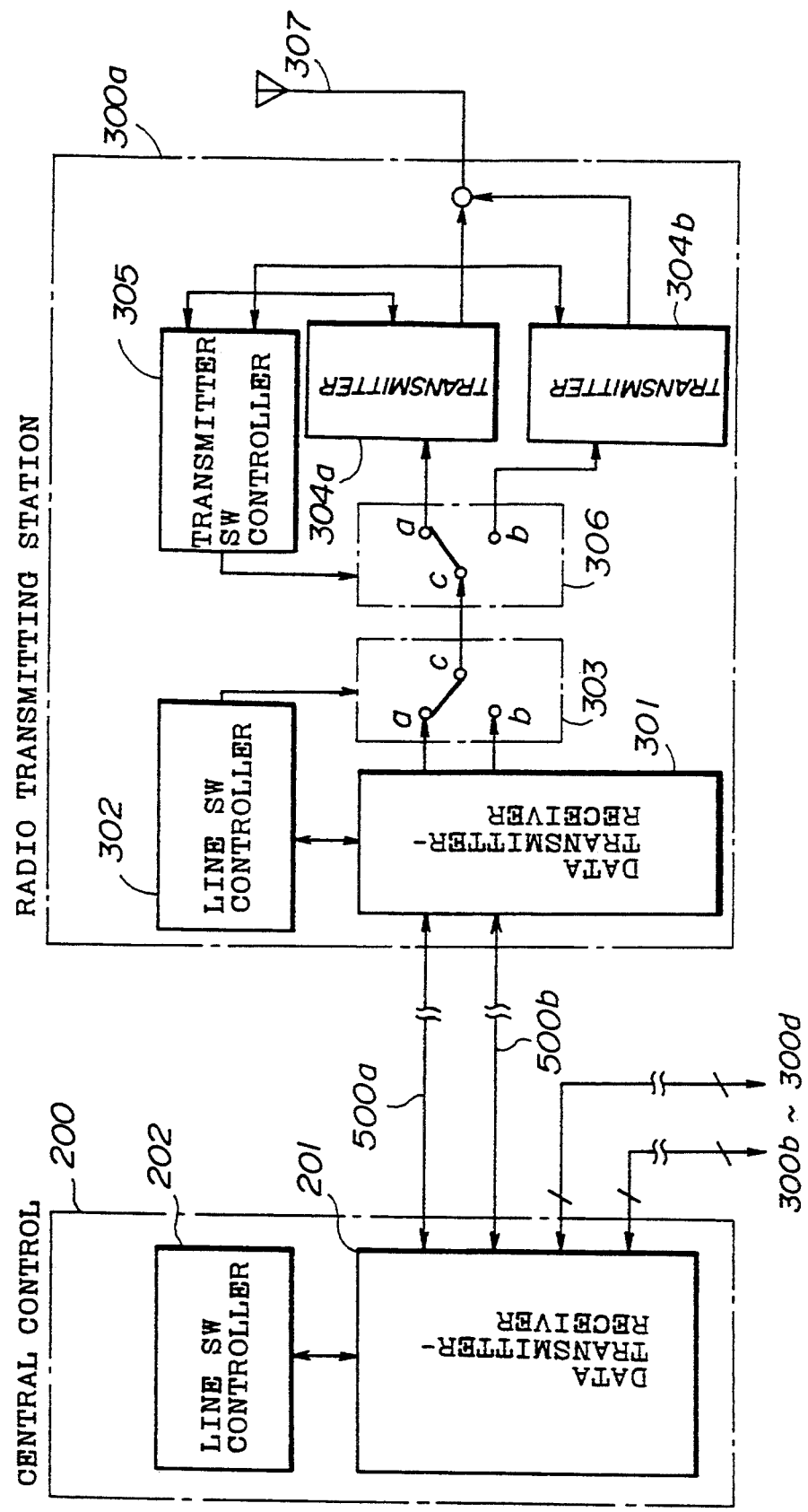
FIG. 2 is a system block diagram showing the construction of an essential part of the conventional radio calling system.
Figure 3:
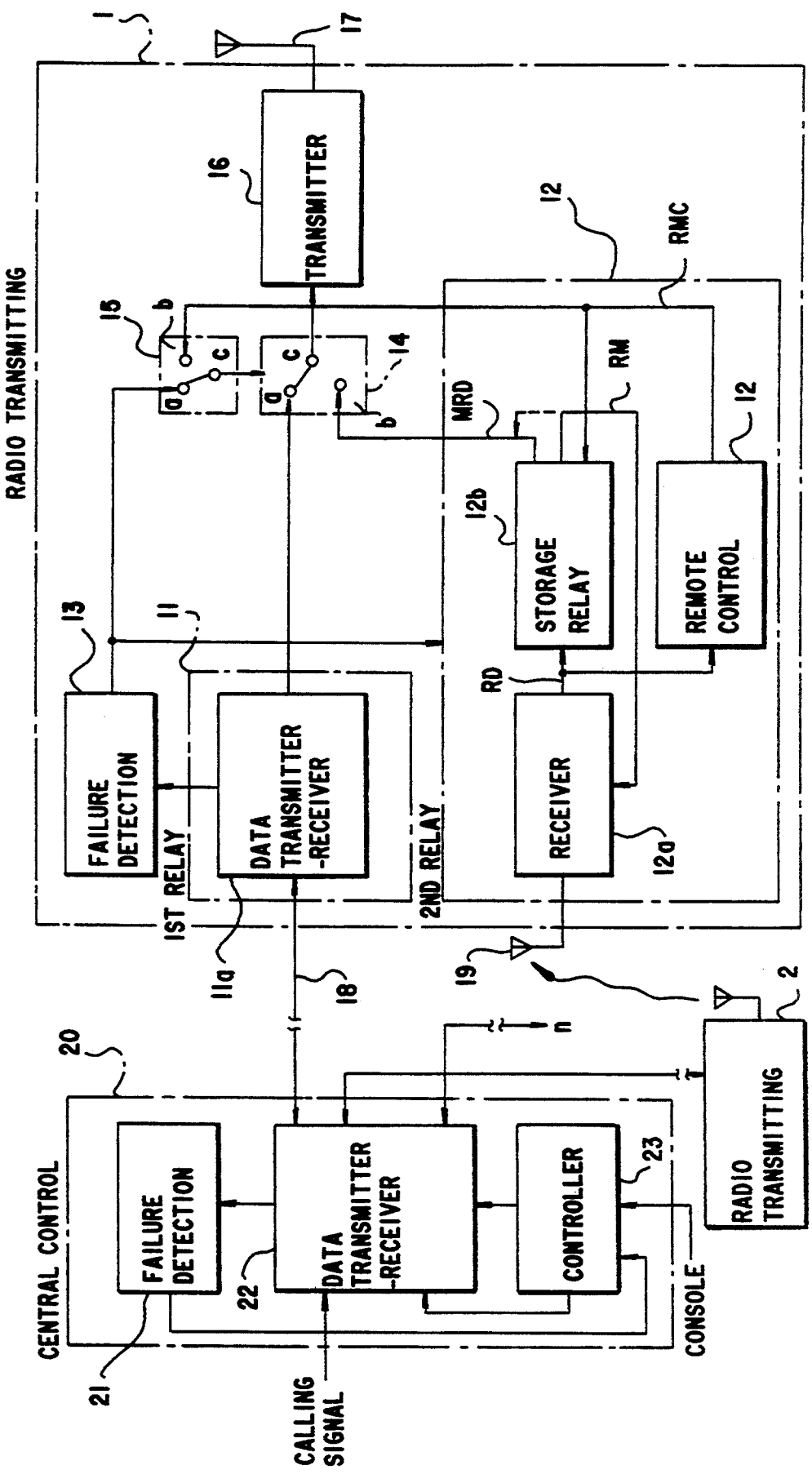
FIG. 3 is a system block diagram for explaining the operating principle of the present invention.

In a radio calling system shown in FIG. 3, a central control station 20 simultaneously broadcasts a pager terminal calling number from the subscriber to a plurality of radio transmitting stations 1 through n via leased lines. In addition, the radio transmitting stations 1 through n simultaneously transmits a calling signal of the pager terminal calling number at the same radio frequency so as to call the pager terminal. Each of the radio transmitting stations 1 through n have a first relay part 11 which includes a data transmitter-receiver 11a for relaying the calling signal from the central control station 20, and a second relay part 12 which includes a receiver part 12a and a storage relay part 12b. The receiver part 12a receives the calling signal transmitted from other radio transmitting stations. The storage relay part 12b stores the calling signal which is received by the receiver part 12a, and transmits the stored calling signal when the other radio transmitting stations are not transmitting. A switching is made between the first and second relay parts 11 and 12 depending on whether or not a communication failure exists between the central control station 20 and the radio transmitting station to which the first and second relay parts 11 and 12 belong.

According to the present invention, the first relay part 11 is constructed to relay the calling signal from the central control station 20 in real time. On the other hand, in the second relay part 12, the receiver part 12a receives via a high-sensitivity reception antenna 19 the calling signal which is transmitted from the other neighboring radio transmitting station. In addition, the storage relay part 12b stores the calling signal which is received by the receiver part 12a, and reads out the stored calling signal when the other radio transmitting stations are not transmitting.

Normally, a switching circuit 14 is connected to a terminal a, and the first relay part 11 relays via radio the calling signal from the central control station 20 in real time. However, if both normal and emergency lines 18 fail, the switching circuit 14 is switched over and connected to a terminal b, so that the storage relay part 12b stores the calling signal which is received from the neighboring radio transmitting station and transmits via radio the stored calling signal with a time delay. Accordingly, the calling service can be continued even if both the normal and emergency lines 18 fail.

Preferably, each of the radio transmitting stations 1 through n are provided with a communication failure detection part 13 for detecting a communication failure between the central control station 20 and the radio transmitting station to which the communication failure detection part 13 belongs. For example, the communication failure detection part 13 switches and connects the switching circuit 14 to the terminal b when the failure of both the normal and emergency lines 18 is detected, so as to automatically switch the calling path from the first relay part 11 to the second relay part 12. Hence, the calling service can be continued automatically without the need for the maintenance person or the central control station 20 to make a special operation.

In addition, the communication failure detection part 13 preferably switches and connects the switching circuit 14 to the terminal a when the restoration of both the normal and emergency lines 18 is detected, so as to automatically return the calling path from the second relay part 12 to the first relay part 11. In this case, the central control station 20 does not need to make a special control operation from the time when both the normal and emergency lines 18 fail up to the time when both the normal and emergency lines 18 are restored.

Preferably, the second relay part 12 is activated in response to the communication failure detection of the communication failure detection part 13. In this case, the second relay part 12 does not operate or no power is supplied thereto while the second relay part 12 is not active. For this reason, it is possible to minimize the power consumption of the radio transmitter station.

It is also preferable that the receiver part 12a does not make a receiving operation while the storage relay part 12b makes a transmission. In this case, it is possible to prevent a sneak path from a transmission antenna 17 while the second relay part 12 makes a relay operation, and the construction and control of the second relay part 12 become simple.

Preferably, the second relay part 12 is provided with a remote control part 12c for recognizing a control signal which is within the calling signal received by the receiver part 12a and intended for the radio transmitting station to which the remote control part 12c belongs. Based on this control signal, the remote control part 12c activates/deactivates the storage relay part 12b or switches the first and second relay parts 11 and 12. Accordingly, the central control station 20 can control the operation of the storage relay part 12b by remote control if necessary, regardless of whether or not the communication failure detection part 13 detects a communication failure. In addition, by switching and connecting a manually controlled switching circuit 15 to a terminal b, the central control station 20 can also control the switching of the first and second relay parts 11 and 12 by remote control if necessary.

If there is a communication failure between the central control station 20 and a specific radio transmitting station, it is preferable that the central control station 20 inserts a control signal intended for the specific radio transmitting station into the calling signal via a controller 23. Because this calling signal is simultaneously transmitted from all of the radio transmitting stations 1 through n, the mere insertion of the control signal into the calling signal enables the central control station 20 to remotely control the specific radio transmitting station without making a special control.

Preferably, when the communication failure exists between the central control station 20 and the radio transmitting station, the controller 23 provides a calling pause time with respect to a data transmitter-receiver 22 after the simultaneous broadcasting of the calling signal. This calling pause time is greater than or equal to the time required to simultaneously transmit the calling signal via radio. In this case, the simultaneous transmission of the calling signal and the storage and transmission of the calling signal by the specific radio transmitting station will not be carried out at the same time.

Figure 4:
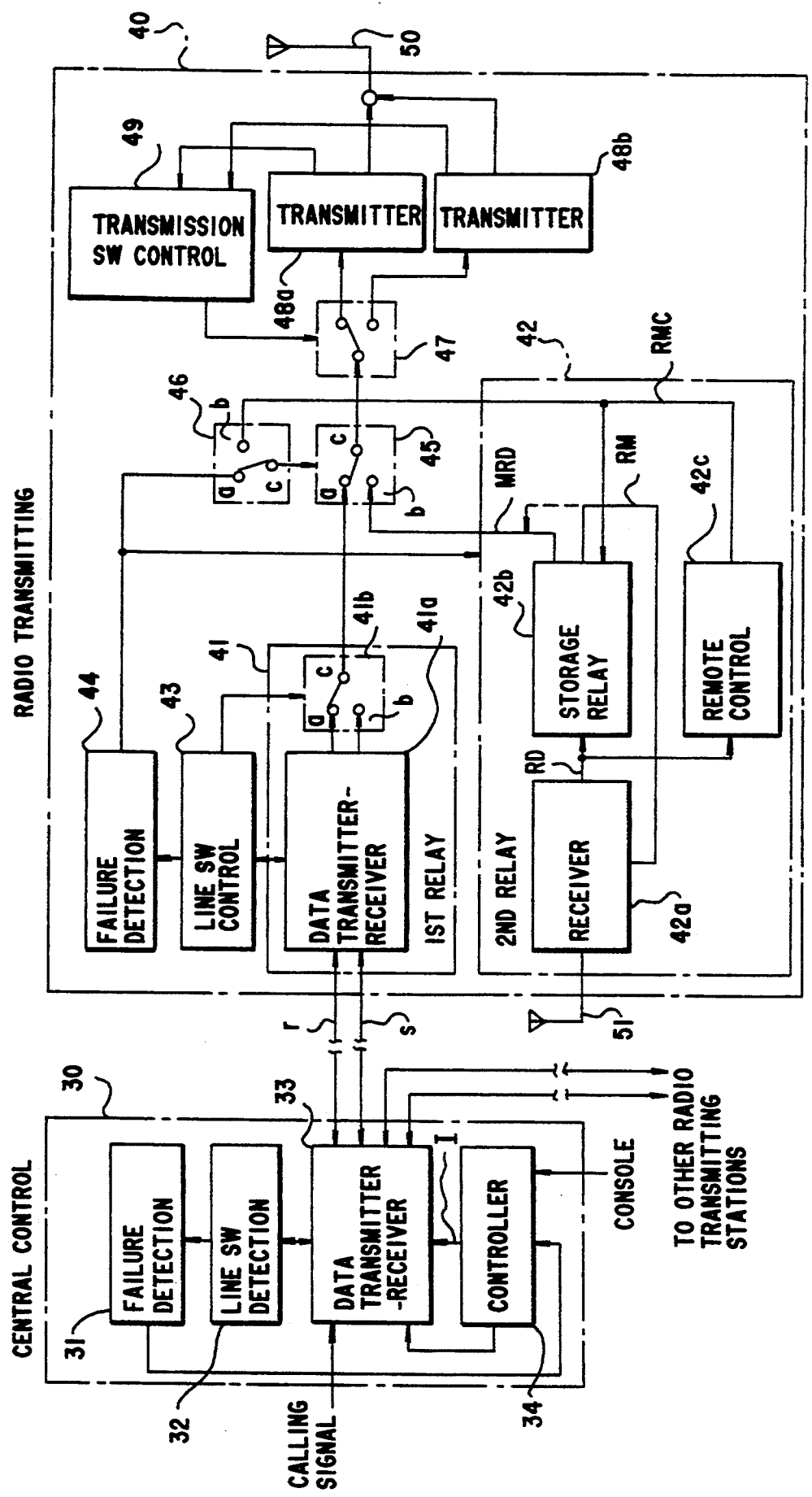
FIG. 4 is a system block diagram generally showing an embodiment of a radio calling system according to the present invention.

Next, a description will be given of an embodiment of a radio calling system according to the present invention, by referring to FIG. 4. FIG. 4 generally shows an embodiment of the radio calling system of the present invention.

In FIG. 4, a central control station 30 corresponds to the central control station 20 shown in FIG. 3. The central control station 30 includes a communication failure detection part 31, a line switch controller 32, a data transmitter-receiver 33 and a controller 34. The communication failure detection part 31, the data transmitter-receiver 33 and the controller 34 respectively correspond to the communication failure detection part 21, the data transmitter-receiver 22 and the controller 23 shown in FIG. 3.

On the other hand, a radio transmitting station 40 includes a first relay part 41 provided with a data transmitter-receiver 41a and a switching circuit b, a second relay part 42 provided with a receiver part 42a, a storage relay part 42b and a remote control part 42c, a line switch controller 43, a communication failure detection part 44, a switching circuit 45, a manually operated switching circuit 46, a switching circuit 47, transmitters 48a and 48b, a transmission switch controller 49, a transmission antenna 50, and a reception antenna 51. The radio transmitting station 40, the first relay part 41, the second relay part 42, the communication failure detection part 44, the switching circuit 45, the transmission antenna 50 and the reception antenna 51 respectively correspond to the radio transmitting station 1, the first relay part 11, the second relay part 12, the communication failure detection part 13, the switching circuit 14, the transmission antenna 17 and the reception antenna 19 shown in FIG. 3. The data transmitter-receiver 41a, the receiver part 42a, the storage relay part 42b and the remote control part 42c respectively correspond to the data transmitter-receiver 11a, the receiver part 12a, the storage relay part 12b and the remote control part 12c. The transmitters 48a and 48b correspond to the transmitter 16.

Normally, the switching circuit 45 is connected to a terminal a and the first relay part 41 relays the calling signal from the central control station 30 in real time. The line switch controller 43 monitors the operating states (the operating states including the data transmitter-receiver 41a) of both the normal and emergency lines r and s. The line switch controller 43 switches to the emergency line s if the normal line r fails, and switches to the normal line r if the emergency line s fails. The communication failure detection part 44 monitors the state of the line switch controller 43, and switches and connects the switching circuit 45 to a terminal b if both the normal and emergency lines r and s fail. When the switching circuit 45 is connected to the terminal b, the storage relay part 42b relays via radio and with a time delay the calling signal which is received from a neighboring radio transmitting station. When both the normal and emergency lines r and s are restored, the communication failure detection part 44 switches and connects the switching circuit 45 to a terminal a, so as to return the calling path from the second relay part 42 to the first relay part 41.

The second relay part 42 is activated in response to the detection of the communication failure by the communication failure detection part 44 and starts to operate or receives power when activated. On the other hand, the second relay part 42 is deactivated in response to the detection of the communication restoration by the communication failure detection part 44, and stops operating or receives no power when deactivated. A read mode signal RM from the storage relay part 42b is input to the receiver part 42a, and the receiver part 42a does not make a reception operation while a calling signal data MRD is read out from the storage relay part 42b and is transmitted from the transmitter 48a or 48b.

The remote control part 42c outputs a remote control signal RMC by recognizing a control signal which is intended for the radio transmitting station to which the remote control part 42c belongs and is within the calling signal which is received by the receiver part 42a of the same radio transmitting station. This remote control signal RMC is applied to the storage relay part 42b and activates/deactivates the storage relay part 42b. Furthermore, if the manually operated switching circuit 46 is connected to a terminal b, the remote control signal RMC switches the first and second relay parts 41 and 42.

On the other hand, if the communication failure detection part 31 judges that a communication failure exists between the central control station 30 and one of the radio transmitting stations or the maintenance person inputs from a console (not shown) a message which indicates a communication failure on a specific line, the controller 34 of the central control station 30 inserts into the calling signal a control signal which is intended for the radio transmitting station which is connected to the line with the communication failure. In this case, the controller 34 generates a transmission suppression signal I in order to provide with respect to the data transmitter-receiver 33 a calling pause time after the data transmitter-receiver 33 simultaneously broadcasts the calling signal. This transmission suppression signal I is applied to the data transmitter-receiver 33. The calling pause time is greater than or equal to the time required to simultaneously transmit the calling signal via radio. The inquiries from the central control station 30 to each of the radio transmitting stations are not interfered by the transmission suppression signal I.

The above described functions of the controller 34 are realized by programs of a central processing unit (CPU, not shown) which forms the controller 34. Hence, those skilled in the art may easily realize the above described functions of the controller 34 by programs.

Figure 5:
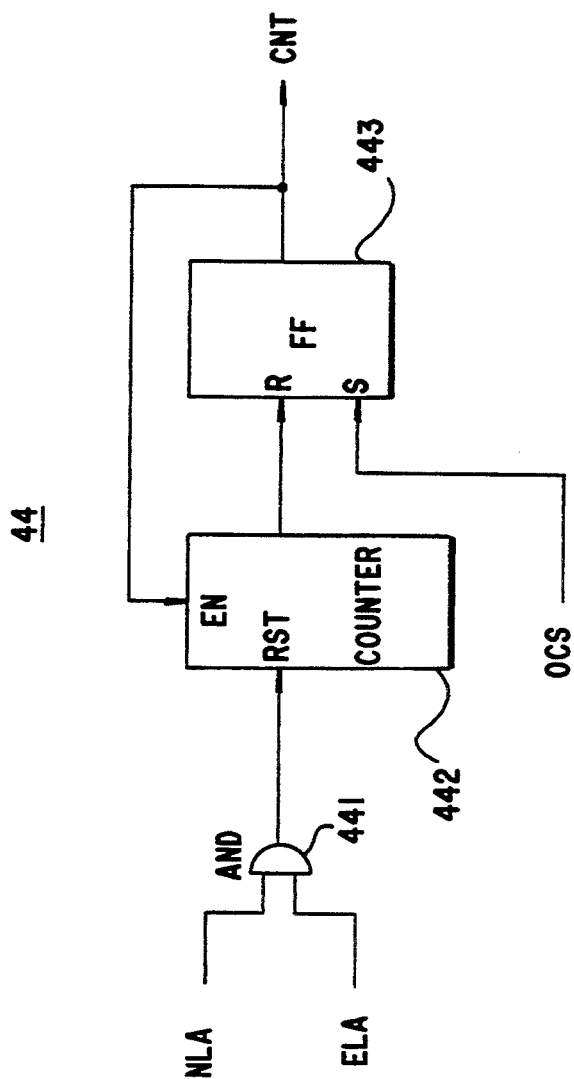
FIG. 5 is a system block diagram showing an embodiment of a communication failure detection part shown in FIG. 4.

FIG. 5 shows an embodiment of the communication failure detection part 44. The communication failure detection part 44 includes an AND circuit 441, a counter 442 and a flip-flop 443. The AND circuit 441 receives a normal line alarm signal NLA and an emergency line alarm signal ELA, and outputs a signal to a reset terminal RST of the counter 442. The flip-flip 443 has a reset terminal R which receives an output signal of the counter 442, and a set terminal which receives an operation cancel signal OCS. An output signal of the flip-flop 443 is supplied to an enable terminal EN of the counter 442 and is output as a control signal CNT.

The normal line alarm signal NLA and the emergency line alarm signal ELA are high-active signals. On the other hand, the control signal CNT is a low-active signal and is used to start the second relay part 42 and the like.

When both the normal line alarm signal NLA and the emergency line alarm signal ELA have the high level, a high-level signal is applied to the reset terminal RST of the counter 442 from the AND circuit 441. Hence, the counter 442 starts a counting operation. When a predetermined time elapses and the counted value of the counter 442 reaches a predetermined value, a low-level signal is applied to the reset terminal R of the flip-flop 443 and makes the control signal CNT active, that is, a low-level control signal CNT is output from the flip-flop 443. At the same time, the enable terminal EN of the counter 442 receives the low-level control signal CNT and the counting operation of the counter 442 stops.

The flip-flop 443 is set when the operation cancel signal OCS is applied to the set terminal S of the flip-flop 443. In this case, the communication failure detection part 44 assumes a waiting state.

Of course, the communication failure detection part 21 of the central control station 20 may have a construction similar to that of the communication failure detection part 44 shown in FIG. 5.

Figure 6:
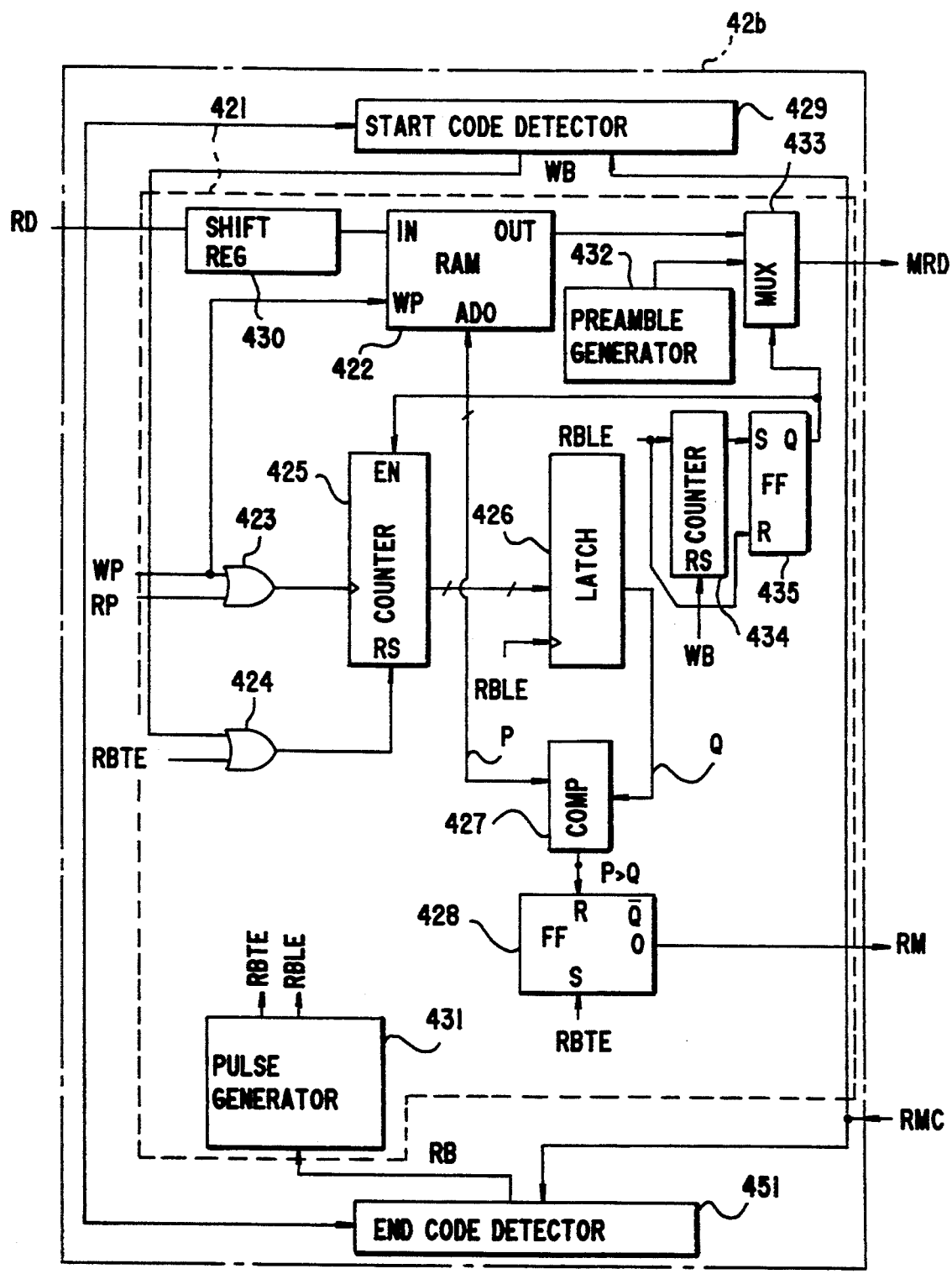
FIG. 6 is a system block diagram showing an embodiment of a storage relay part shown in FIG. 4.

FIG. 6 shows an embodiment of the storage relay part 42b. The storage relay part 42b includes a memory part 421, a start code detector 429 and an end code detector 430. The memory part 451 includes a random access memory (RAM) 422, OR circuits 423 and 424, a counter 425, a latch circuit 426, a comparator 427, a flip-flop 428, a shift register 430, a pulse generator 431, a preamble generator 432, a multiplexer 433, a counter 434 and a flip-flop 435 which are connected as shown. The start code detector 429 detects a calling start code within the calling signal, and the end code detector 451 detects a calling end code within the calling signal.

Figure 7:
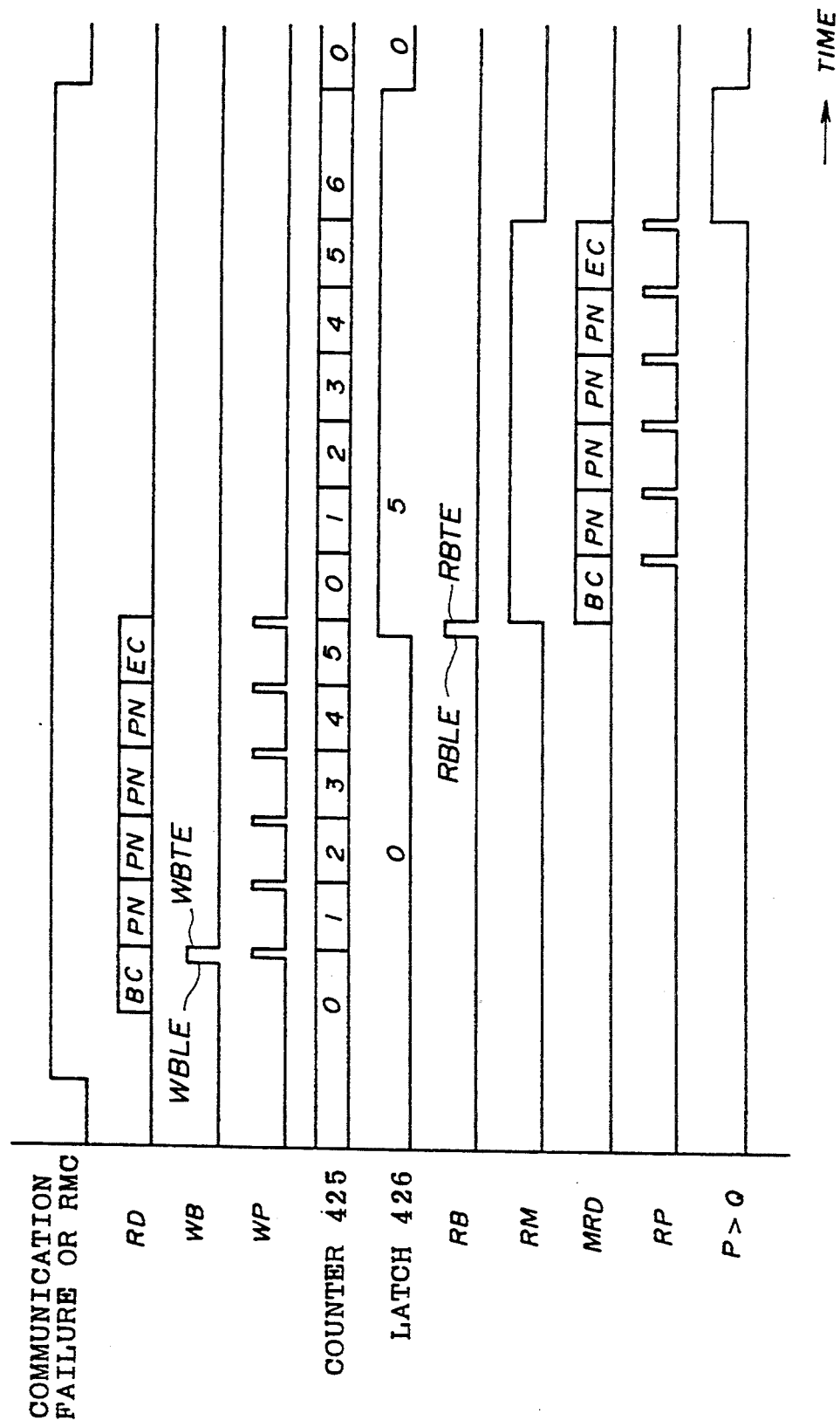
FIG. 7 is a timing chart for explaining the operation of the storage relay part shown in FIG. 6.

FIG. 7 is a timing chart for explaining the operation of the storage relay part 42b.

Figure 8A:
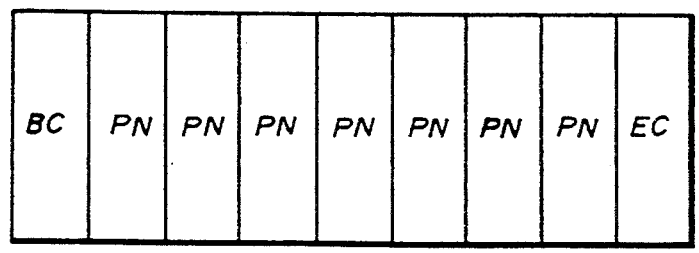
FIGS. 8A, 8B and 8C respectively show formats of calling data.

As shown in FIG. 8A, a normal calling signal includes a calling start code BC, one or a plurality of pager terminal numbers PN, and a calling end code EC. The start code detector 429 detects the calling start code BC within a received signal RD and outputs a write start pulse WB with respect to the memory part 421. More particularly, the start code detector 429 supplies the write start pulse WB to the OR circuit 424. The counter 425 is reset in response to a leading edge WBLE of the write start pulse WB, and increments the count in response to a write pulse WP which is transmitted from the receiver part 42a together with the received signal RD. A counter output of the counter 425 is applied to an address input ADD of the RAM 422. The shift register 430 successively shifts the received signal (data) RD from the receiver part 42a, so that the signal input to an input IN of the RAM 422 becomes the first bit of the calling start code BC at the time when the start code detector 429 detects the calling start code BC. Hence, the calling start code BC and the one or a plurality of pager terminal numbers PN are successively written into the RAM 422 in response to a write pulse WP as the address is incremented by the counter output of the counter 425.

When the calling end code EC is input a thereafter, the end code detector 451 detects the calling end code EC within the received signal RD and outputs a read start pulse RB with respect to the memory part 421. More particularly, the read start pulse RB is supplied to the pulse generator 431 which generates signals corresponding to a leading edge RBLE and a trailing edge RBTE of the read start pulse RB. The latch circuit 426 latches the counter output of the counter 425 in response to the leading edge RBLE of the read start pulse RB. The counter 425 is reset by the trailing edge RBTE of the read start pulse RB via the OR circuit 424.

On the other hand, the flip-flop 428 is forcibly set in response to the trailing edge RBTE of the read start pulse RB, and the level of a read mode signal RM becomes high from this point in time. This read mode signal RM determines the timing with which the stored calling signal is relayed with a time delay, and the simultaneous transmission of the calling signal by the other radio transmitting stations is already ended when the relaying of the stored calling signal starts.

When the level of the read mode signal RM becomes high, the transmission operation of the transmitter 48a or 48b is activated thereby. Hence, a read pulse RP is transmitted from the transmitter 48a or 48b, and the counted value of the counter 425 is again incremented in response to the read pulse PR which is received via the OR circuit 423. The previously written calling start code BC, the one or a plurality of pager terminal numbers PN and the calling end code EC are successively read out from the RAM 22 from the address which is incremented. In this state, the comparator 427 compares a counter output P of the counter 425 and a latch output Q of the latch circuit 426, and forcibly resets the flip-flop 428 if the condition P>Q is satisfied. This corresponds to the end of the relaying cycle which stores the calling signal and relays the stored calling signal with the time delay described above.

The preamble generator 432 generates a preamble which is transmitted prior to the calling start code BC. This preamble which is required in the calling signal has a pattern made up of consecutive "0"s or "1"s and is used to synchronize the receiver part 42a The multiplexer 433 switches the outputs of the RAM 422 and the preamble generator 432.

The counter 434 starts to count when the end code detector 451 detects the calling end code EC and the leading edge RBLE of the read start pulse RB is supplied to the counter 434. At the same time, the flip-flop 435 is reset by this leading edge RBLE. Hence, in this case, the multiplexer 433 outputs the preamble which is output from the preamble generator 432 in response to an output of the flip-flop 435.

On the other hand, when the counted value of the counter 434 reaches a value corresponding to the number of bits of the preamble, a signal is input to a set terminal S of the flip-flop 435 to set the flip-flop 435. Thus, the multiplexer 433 in this case outputs the output of the RAM 422 in response to the output of the flip-flop 435.

The output of the flip-flop 435 is also supplied to an enable terminal EN of the counter 425, so that the counter 425 does not count up while the counter 434 is counting the number of bits of the preamble.

The output of the multiplexer 433 is output to the switching circuit 45 as the calling signal data MRD.

Figure 9:
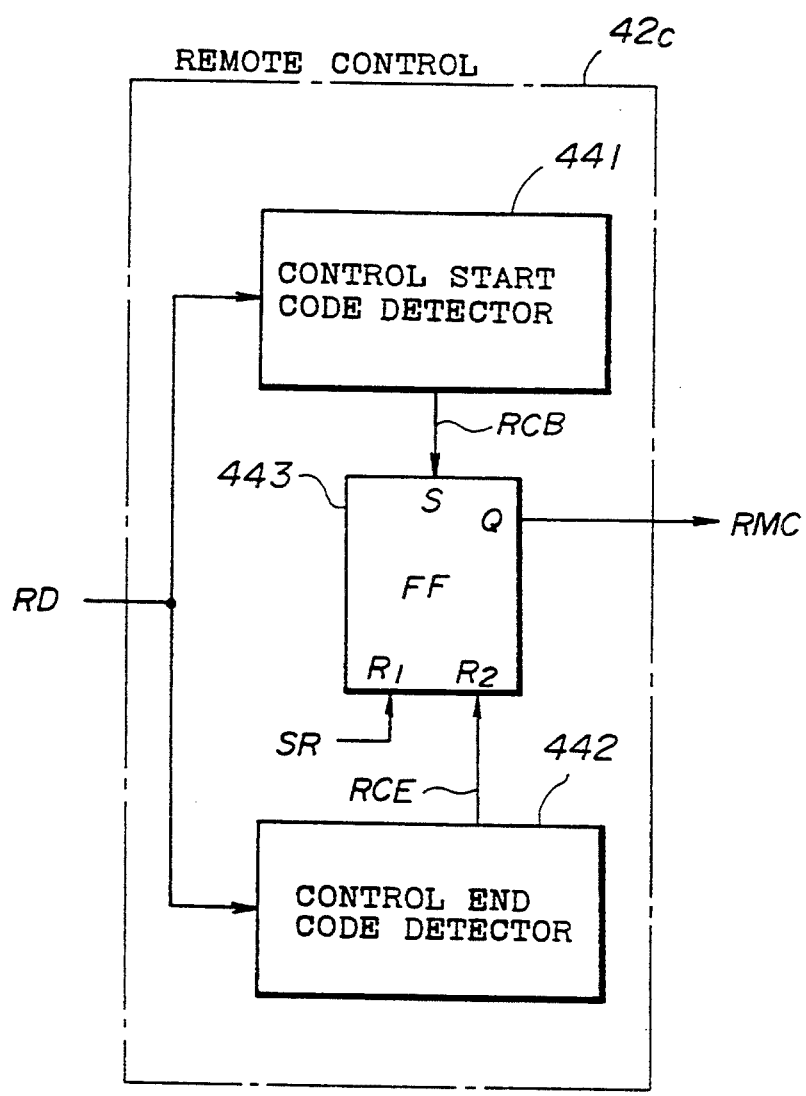
FIG. 9 is a system block diagram showing an embodiment of a remote control part shown in FIG. 4.

FIG. 9 shows an embodiment of the remote control part 42c. The remote control part 42c includes a control start code detector 441, a control end code detector 442 and a flip-flop 443.

Figure 10:
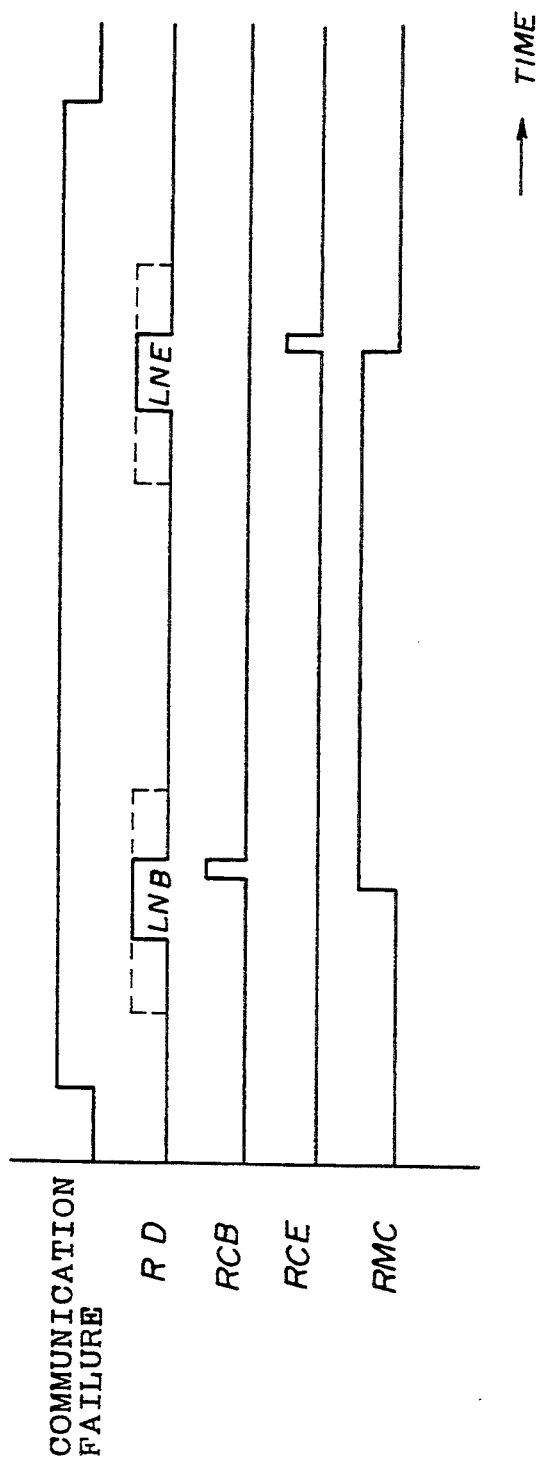
FIG. 10 is a timing chart for explaining the operation of the remote control part shown in FIG. 9.

FIG. 10 is a timing chart for explaining the operation of the remote control part 42c shown in FIG. 9.

Next, a description will be given of the remote control part 42c, by referring to FIGS. 9 and 10.

Figure 8B:
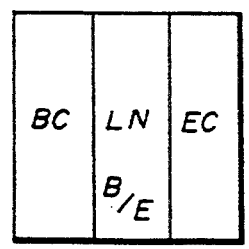

For example, the control signal is made up of the calling start code BC, a control start or end code LN B/E, and the calling end code EC as shown in FIG. 8B. This type of control signal does not include the pager terminal number PN of the pager service user, and will not affect the pager terminals of the pager service user even if the control signal is simultaneously transmitted from each of the radio transmitting stations. Accordingly, the central control station 30 can arbitrarily transmit to each radio transmitting station LN the control start code B or the control end code E as the calling signal. By this procedure, the control signal can be transmitted independently between the normal calling signal and the next normal calling signal, making it convenient for the central control station 30 to control the storage relay part 42b and the switching circuit 47 by remote control.

Figure 8C:
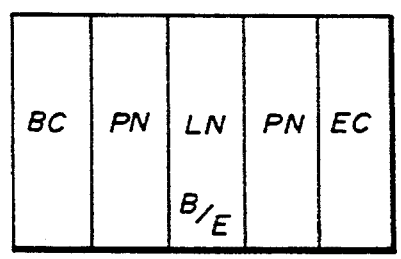

In addition, the control signal may be transmitted in a format in which the control start or end code LN B/E is inserted within the normal calling signal, as shown in FIG. 8C. However, in this case, the storage relay part 42b is activated or the switching circuit 45 is switched after the remote control part 42c detects the control start code LN B, for example, and the central control station 30 must take measures so that the simultaneously transmitted pager terminal number PN will not be stored and relayed. For example, the central control station 30 may retransmit the pager terminal number PN.

In either case, the control start code detector 441 outputs a control start pulse RCB when the control start code detector 441 detects the control start code LN B which is within the received signal RD and is intended for the radio transmitting station to which the remote control part 42c belongs. This control start pulse RCB forcibly sets the flip-flop 443. As a result, the level of a remote control signal RMC becomes high. In addition, the control end code detector 442 outputs a control end pulse RCE when the control end code detector 442 detects the control end code LN E which is within the received signal RD and is intended for the radio transmitting station to which the remove control part 42c belongs. This control end pulse RCE forcibly resets the flip-flop 443. Hence, the level of the remote control signal RMC becomes low.

Figure 11:
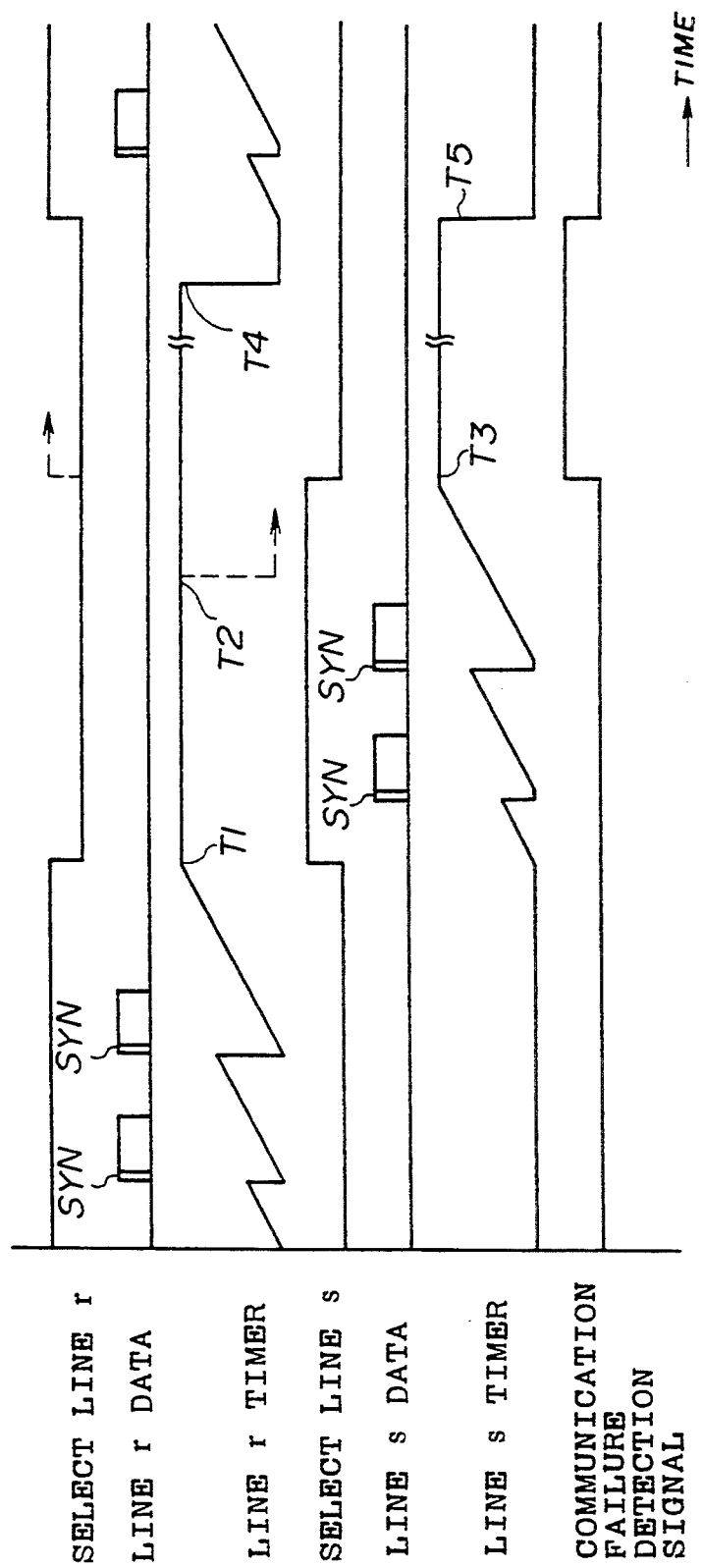
FIG. 11 is a timing chart for explaining a transmission failure/restoration detection operation of the embodiment.

FIG. 11 is a timing chart for explaining the communication failure/restoration detection operation of this embodiment. If it is assumed for the sake of convenience that the line switch controller 43 selects the normal line r, an inquiry signal from the central control station 30 arrives at the normal line r at a rate of four times per second, for example. The line switch controller 43 detects a synchronizing pattern signal SYN which is transmitted at the beginning of the inquiry signal, and a timer (not shown) counts an interval of the synchronizing pattern signals SYN. Accordingly, if the normal line r fails for some reason, the timer overflows and the communication failure of the normal line r is detected with a timing indicated by T1, and the line switching controller 43 switches the line to the emergency line s.

Similarly, if the communication failure is detected in the emergency line s at a time T3, the line should be switched to the normal line r at the time T3 if the normal line r is restored at a time T2 which precedes the time T3. But if the normal line r is not restored by the time T2, the communication failure exists in both the normal and emergency lines r and s, and the level of a communication failure detection signal is set to a high level.

If the normal line r is restored thereafter at a time T4 and the emergency line s is restored at a time T5, both the normal and emergency lines r and s are restored. Hence, in this case, the level of the communication failure detection signal is set to a low level.

The line switching controller 32 and the communication failure detection part 31 within the central control station 30 carry out operations similar to those described above.

Figure 12:
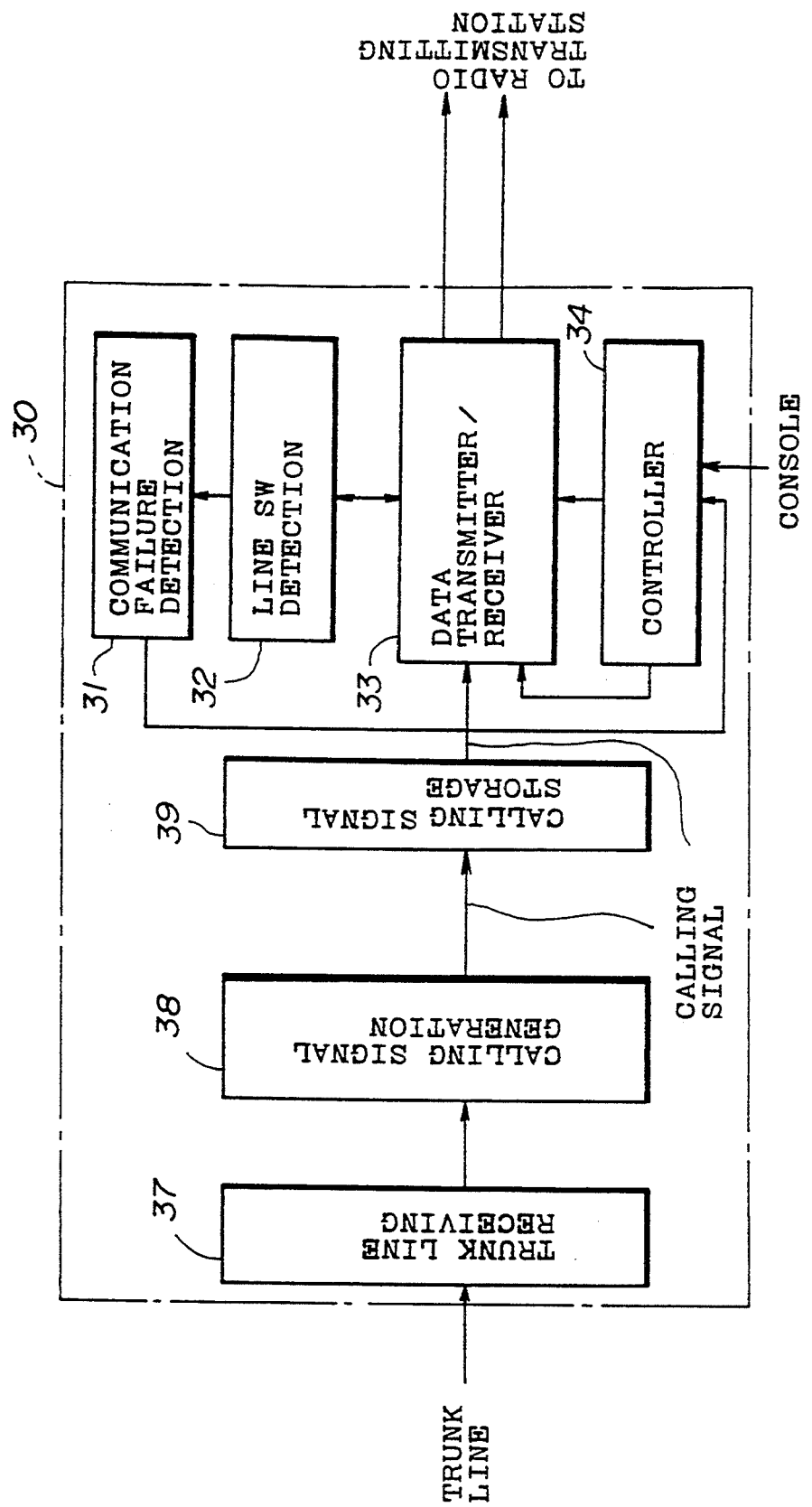
FIG. 12 is a system block diagram showing an embodiment of a central control station.

FIG. 12 is a system block diagram showing an embodiment of the central control station 30 shown in FIG. 4. In FIG. 12, those parts which are the same as those corresponding parts in FIG. 4 are designated by the same reference numerals, and a description thereof will be omitted.

In FIG. 12, the central control station 30 includes the communication failure detection part 31, the line switch detection part 32, the data transmitter-receiver 33, the controller 34, a trunk line receiving part 37, a calling signal generation part 38 and a calling signal storage part 39 which are connected as shown.

The call from the public line network is received by the trunk line receiving part 37 via a trunk line and is supplied to the calling signal generation part 38. The calling signal generation part 38 converts the received call into the format of the calling signal. The calling signal storage part 39 stores the calling signal output from the calling signal generation part 38. The controller 34 carries out a control so that the stored calling signal is read out from the calling signal storage part 39 and is transmitted to each of the radio transmitting stations from the data transmitter-receiver 33 at a rate of once per several tens of seconds, for example.

Normally, the calling signal is transmitted a plurality of times at predetermined time intervals so as to improve the reliability of the paging system, and the pager terminal is provided with the function of neglecting the same calling signal if the same calling signal is received within the predetermined time interval. If the traffic is less than 50% and small, the controller 34 does not need to carry out a special control of the traffic even if a communication failure is detected in the leased line which connects the central control station 30 to a specific radio transmitting station. This is because the small traffic enables one of the radio transmitting stations to transmit the stored calling signal with a time delay after the simultaneous transmission of the same calling signal is made by all of the radio transmitting stations excluding the specific radio transmitting station.

However, if the traffic is greater than or equal to 50%, the controller 34 must carry out a special control of the traffic so that the transmission of the stored calling signal from the specific radio transmitting station is guaranteed. For example, the controller 34 carries out a control so that the a predetermined time interval equal to the transmission time of the calling signal is provided after each transmission of the calling signal.

In the described embodiment, the end code detector 451 detects the end of the calling signal, that is, the end of the communication, from the calling end code EC of the calling signal. However, the format of the calling signal is not limited to that shown in FIG. 8A and the calling signal may not include the calling end code EC. If the calling signal does not include the calling end code EC, the end of the calling signal can still be detected by detecting the synchronization of the calling signal, for example. In other words, the end of the calling signal may be detected if the synchronization of the contents (data) of the calling signal is lost.

Further, the present invention is not limited to these embodiments, but various variations and modifications may be made without departing from the scope of the present invention.

What is claimed is:

1. A radio calling system comprising:
   a central control station simultaneously broadcasting a calling signal of an arbitrary pager terminal; and
   a plurality of radio transmitting stations, coupled to said central control station, for simultaneously transmitting said calling signal received from said central control station at same radio frequency, said calling signal transmitted from said radio transmitting stations reaching said arbitrary pager terminal and at least a neighboring one of said radio transmitting stations;
   at least an arbitrary one of said radio transmitting stations including:
      first relay means for relaying the calling signal received from said central control station;
      second relay means comprising a receiver part for receiving the calling signal which is transmitted from one of said radio transmitting stations other than said at least an arbitrary one of said radio transmitting stations, and a storage relay part for storing the calling signal received by said receiver part and for transmitting the calling signal stored in said storage relay part during a time in which no transmission is made by the radio transmitting stations other than said arbitrary radio transmitting station;
      means for determining whether a communication failure exists between said central control station and said arbitrary radio transmitting station; and
      switching means, coupled to said first and second relay means, for carrying out a switching to enable said second relay means when a communication failure is determined to exist between said central control station and said arbitrary radio transmitting station.

2. The radio calling system as claimed in claim 1, wherein lines couple said central control station and said radio transmitting stations, and wherein said lines are telephone company telecommunications lines.

3. The radio calling system as claimed in claim 1, wherein said means for determining is a communication failure detection part.

4. The radio calling system as claimed in claim 3, wherein said switching means switches from said second relay means to said first relay means to enable said first relay means when said communication failure detection part detects a communication restoration between said central control station and said arbitrary radio transmitting station.

5. The radio calling system as claimed in claim 3, wherein said second relay means is enabled only when said communication failure detection part detects said communication failure.

6. The radio calling system as claimed in claim 1, wherein said receiver part of said second relay means is disabled during a time in which said stored calling signal within said storage relay part is transmitted.

7. The radio calling system as claimed in claim 1, wherein said second relay means further comprises a remote control part for recognizing a control signal contained within said calling signal received by said receiver part and is intended for said arbitrary radio transmitting station, and said remote control part activates/deactivates said storage relay part or controls the switching of said switching means based on said control signal.

8. The radio calling system as claimed in claim 7, wherein said central control station includes means for inserting within said calling signal said control signal which is intended for said arbitrary radio transmitting station if said communication failure exists.

9. The radio calling system as claimed in claim 1, wherein said central control station includes means for providing a calling pause time after said simultaneous broadcasting of said calling signal if a communication failure exists between said central control station and any one of said radio transmitting stations, said calling pause time being greater than or equal to a time required to simultaneously transmit said calling signal from said radio transmitting stations.

* * * * *

UNITED STATES PATENT AND TRADEMARK OFFICE
CERTIFICATE OF CORRECTION

PATENT NO.  : 5,437,059
DATED       : July 25, 1995
INVENTOR(S) : MURAKAMI et al.

It is certified that error appears in the above-identified patent and that said Letters Patent is hereby corrected as shown below:

On the cover page, Item [73], the second assignee "Aomori Telemessage, Inc., Aomori" should be --Tohoku Telemessage, Inc. Miyagi--.

Signed and Sealed this

Sixteenth Day of April, 1996

Attest:

BRUCE LEHMAN

*Attesting Officer*    Commissioner of Patents and Trademarks